United States Patent
Kubo et al.

(10) Patent No.: US 12,446,815 B2
(45) Date of Patent: Oct. 21, 2025

(54) BIOLOGICAL ELECTRODE

(71) Applicant: NOK CORPORATION, Tokyo (JP)

(72) Inventors: Masayuki Kubo, Kanagawa (JP); Ryo Futashima, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 475 days.

(21) Appl. No.: 17/796,944

(22) PCT Filed: Jan. 12, 2021

(86) PCT No.: PCT/JP2021/000648
§ 371 (c)(1),
(2) Date: Aug. 2, 2022

(87) PCT Pub. No.: WO2021/157287
PCT Pub. Date: Aug. 12, 2021

(65) Prior Publication Data
US 2023/0069007 A1    Mar. 2, 2023

(30) Foreign Application Priority Data
Feb. 7, 2020   (JP) .................................. 2020-019690

(51) Int. Cl.
*A61B 5/25*    (2021.01)
*A61B 5/268*   (2021.01)
(Continued)

(52) U.S. Cl.
CPC .............. *A61B 5/268* (2021.01); *A61B 5/274* (2021.01); *A61B 5/291* (2021.01); *A61B 2562/0215* (2017.08)

(58) Field of Classification Search
CPC . A61B 5/268; A61B 5/274; A61B 2562/0215; A61B 5/291
See application file for complete search history.

(56) References Cited

U.S. PATENT DOCUMENTS

| 2012/0136233 A1* | 5/2012 | Yamashita ........... A61B 5/6803 600/393 |
| 2015/0238100 A1* | 8/2015 | Lin ........................ A61B 5/398 600/393 |

(Continued)

FOREIGN PATENT DOCUMENTS

| CN | 104287727 | 1/2015 |
| EP | 3 220 815 | 5/2016 |

(Continued)

OTHER PUBLICATIONS

Ryo F, Translation of WO-2018230445-A1, 2018 (Year: 2018).*

(Continued)

*Primary Examiner* — Adam Z Minchella
(74) *Attorney, Agent, or Firm* — GREENBLUM & BERNSTEIN, P.L.C.

(57) ABSTRACT

A biological electrode that includes an electrode member made of a conductive rubber having a plurality of electrode portions in contact with a body of a subject. The plurality of electrode portions are protrusively formed on an electrode portion forming surface of the electrode member and arranged circularly or concentrically on the electrode portion forming surface. Further, each of the plurality of electrode portions is formed so that a cross-sectional area thereof gradually decreases from a proximal end portion thereof toward a distal end portion thereof and a center of a cross section of the distal end portion is positioned radially outward of a center of a cross section of the proximal end portion as viewed from an arrangement center of the plurality of electrode portions.

13 Claims, 4 Drawing Sheets

(51) Int. Cl.
    *A61B 5/274*     (2021.01)
    *A61B 5/291*     (2021.01)

(56) References Cited

U.S. PATENT DOCUMENTS

2016/0143554 A1*   5/2016  Lim ................... A61B 5/6803
                                                                     600/386
2019/0150838 A1     5/2019  Greco

FOREIGN PATENT DOCUMENTS

| JP | 2017-74370 | 4/2017 | |
|---|---|---|---|
| JP | 2018-175288 | 11/2018 | |
| WO | 2018/230445 | 12/2018 | |
| WO | WO-2018230445 A1 * | 12/2018 | ............... A61B 5/25 |
| WO | 2019/094609 | 5/2019 | |

OTHER PUBLICATIONS

Extended European Search Report received in Application No. 21751301.9, dated Feb. 13, 2024.
International Search Report issued in International Patent Application No. PCT/JP2021/000648, dated Mar. 30, 2021, along with an English translation thereof.

* cited by examiner a cross-sectional view taken along the line A-A (a)

(b)

BIOLOGICAL ELECTRODE

TECHNICAL FIELD

The present invention relates to a biological electrode and, more particularly, to a biological electrode which can be suitably used for detecting electroencephalogram.

DESCRIPTION OF THE RELATED ART

As an example of this type of biological electrode, a biological electrode described in Patent Document 1 is known. The biological electrode described in Patent Document 1 has an electrode member which is in contact with a body of a subject and a conductive support member which supports the electrode member, and the electrode member is made of a conductive rubber in which at least electrode member contains silicone rubber and silver powder. In the biological electrode described in Patent Document 1, a plurality of electrode members are provided so as to protrude from the support member in a brushed shape.

CITATION LIST

Patent Document

[Patent Document 1] International Publication WO 2018/230445

SUMMARY OF THE INVENTION

Problem to be Solved by the Invention

Many of the conventional biological electrode for detecting electroencephalogram have a plurality of electrode portions (corresponding to the electrode member in Patent Document 1), and a distal end side portion of each electrode portion pushes the hair of the subject aside and comes into contact with the scalp of the subject, thereby enabling detection of electroencephalogram.

Here, for example, when an electroencephalogram of a subject having a large amount of hair is detected, a strong pressing force is required to be applied to the biological electrode in order to prevent the biological electrode from being floated up due to hair and to bring the distal end side portion of each electrode portion into contact with the scalp of the subject. When such a strong pressing force is repeatedly applied to the biological electrode, the distal end side portion of each electrode portion may be deformed. In particular, if the distal end side portion of the electrode portion is bent in the direction opposite (inward) to the direction in which it extends, it becomes difficult to stably contact the distal end side portion of the electrode portion with the scalp of the subject, which may interfere with the detection of electroencephalogram.

Note that this is not limited to the case of detecting electroencephalogram, and is widely common when the distal end side portion of the electrode portion is brought into contact with a body (skin) of a subject to detect a biological signal.

Accordingly, an object of the present invention is to provide a biological electrode capable of suppressing bending in the direction opposite to (inward) the direction in which a distal end side portion of an electrode portion that comes into contact with a body of a subject extends.

Means for Solving the Problems

According to one aspect of the present invention, the biological electrode includes an electrode member made of a conductive rubber having a plurality of electrode portions that comes into contact with a body of a subject. The plurality of electrode portions are protrusively formed on an electrode portion forming surface of the electrode member and arranged circularly or concentrically on the electrode portion forming surface. Further, each of the plurality of electrode portions is formed so that a cross-sectional area thereof gradually decreases from a proximal end portion thereof toward a distal end portion thereof and a center of a cross section of the distal end portion is positioned radially outward of a center of a cross section of the proximal end portion as viewed from an arrangement center of the plurality of electrode portions.

According to another aspect of the present invention, the biological electrode includes a support member, an electrode member made of a conductive rubber, and a connector that electrically connects the electrode member to the outside. The electrode member includes a supported portion supported by the support member and a plurality of electrode portions provided so as to protrude from the supported portion on the opposite side to the support member and bring into contact with a body of a subject. The connector is configured such that a part thereof is embedded in the supported portion of the electrode member and extends through the support member to have a connecting portion to the outside which is positioned on a surface of the support member on the opposite side to the electrode member. The plurality of electrode portions are arranged circularly or concentrically on an electrode portion forming surface of the supported portion. Further, each of the plurality of electrode portions is formed so that a cross-sectional area thereof gradually decreases from the proximal end portion thereof toward the distal end portion thereof and a center of a cross section of the distal end portion is positioned radially outward of a center of a cross section of the proximal end portion as viewed from an arrangement center of the plurality of electrode portions.

Effect of the Invention

According to the present invention, it is possible to provide a biological electrode capable of suppressing a distal end side portion of an electrode portion which is brought into contact with a body of a subject from bending in the direction opposite to (inward) the direction in which the distal end side portion extends.

MODE FOR CARRYING OUT THE INVENTION

Embodiments of the present invention will be described below with reference to the accompanying drawings.

Figure 1:
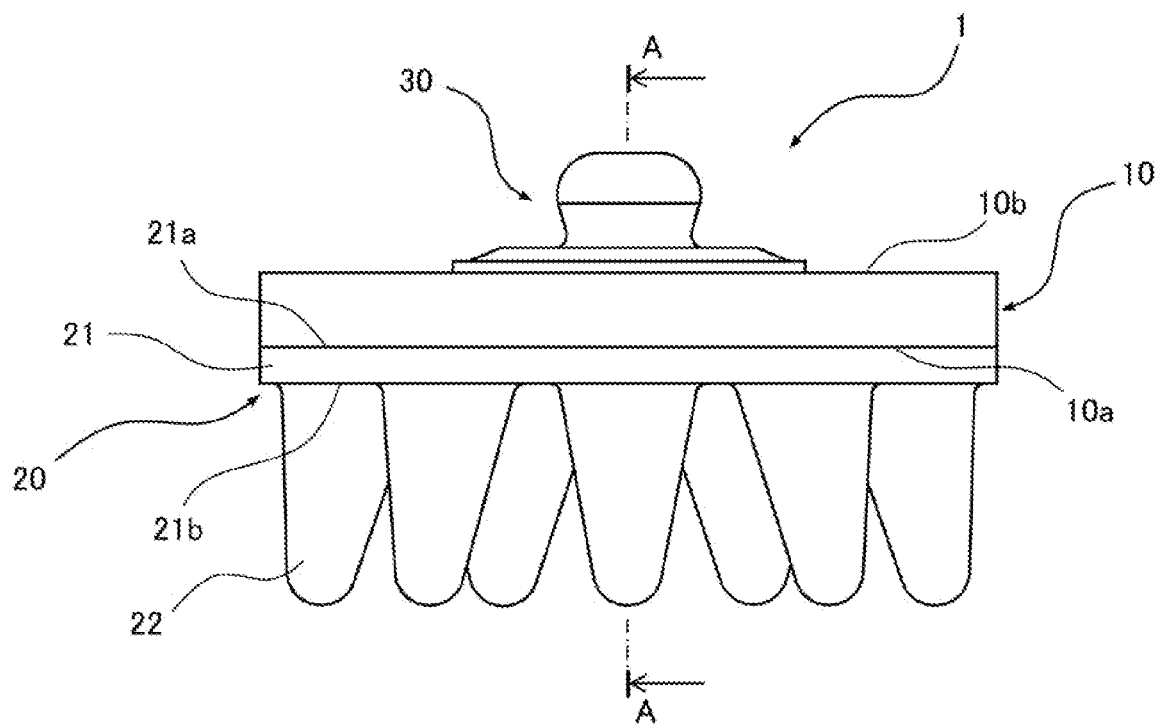
FIG. 1 is a front view of the biological electrode according to an embodiment of the present invention.
Figure 2:
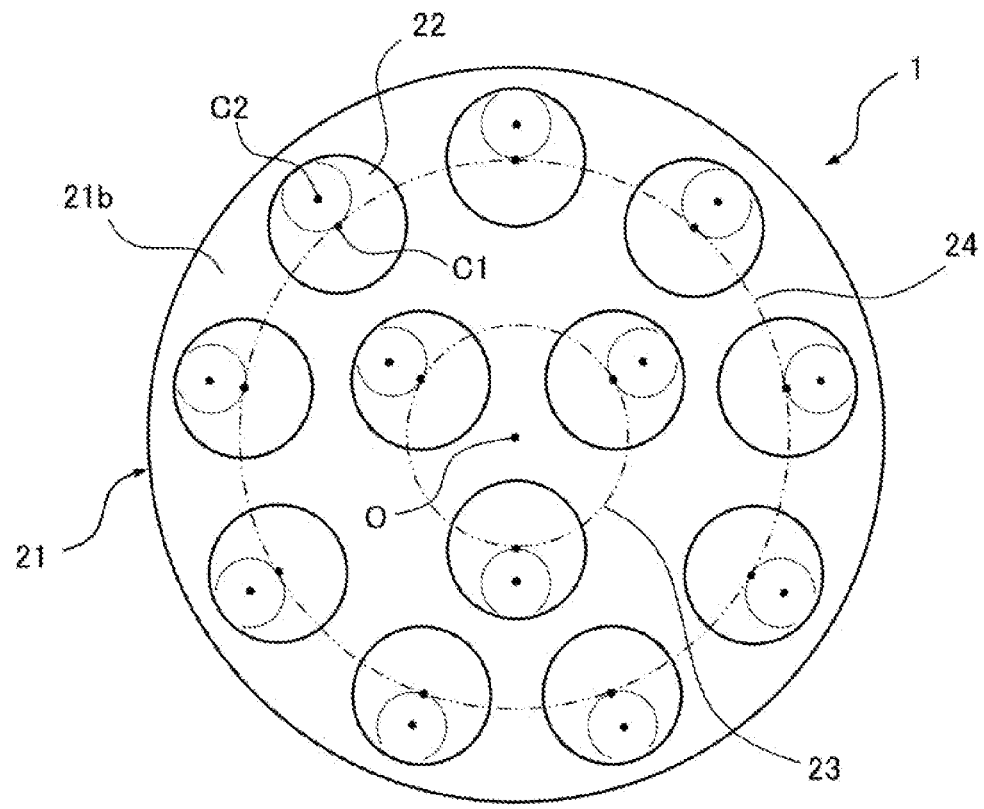
FIG. 2 is a bottom view of the biological electrode.
Figure 3:
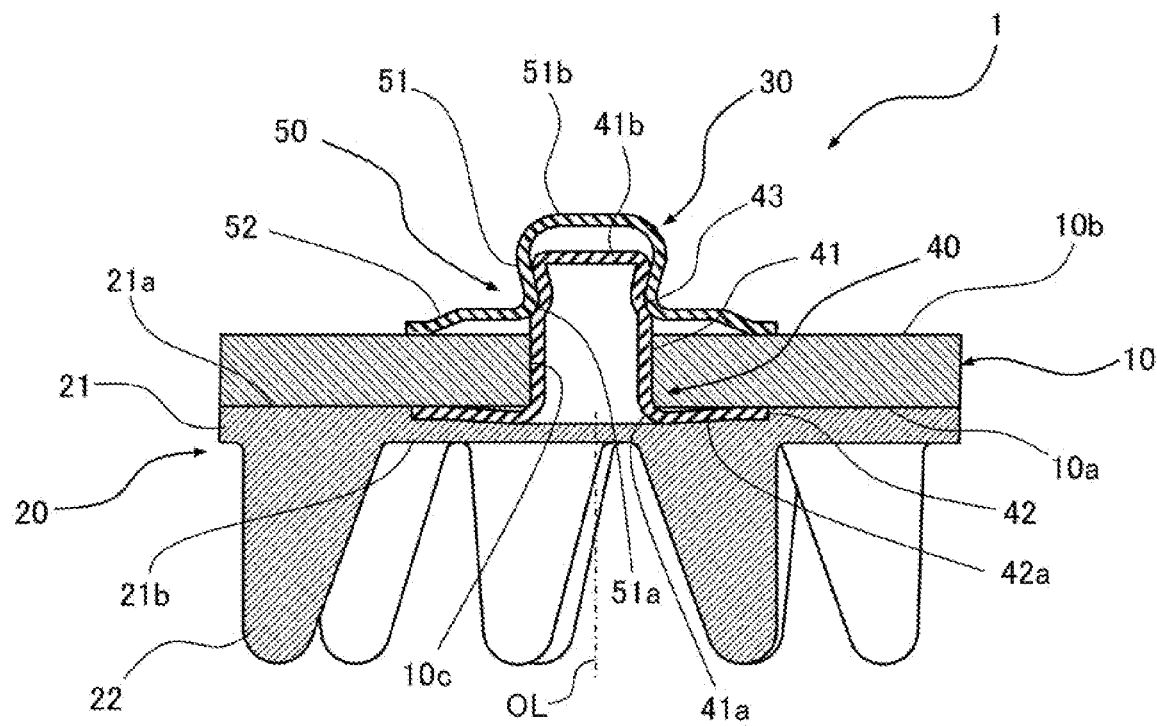
FIG. 3 is a cross-sectional view taken along the line A-A of FIG. 1.

FIG. 1 is a front view of a biological electrode 1 according to an embodiment of the present invention, FIG. 2 is a bottom view of the biological electrode 1, and FIG. 3 is a cross-sectional view taken along the line A-A of FIG. 1. As shown in FIGS. 1 to 3, the biological electrode 1 according to the embodiment includes a support member 10, an electrode member 20 made of a conductive rubber supported by the support member 10, and a connector 30 that electrically connects the electrode member 20 to the outside. The electrode member 20 includes a supported portion 21 supported by the support member 10, and a plurality of electrode portions 22 protruding from the supported portion 21 to the opposite side of the support member 10.

The biological electrode 1 allows the biological signal of a subject to be detected (extracted) via the connector 30 by contacting the distal end portion of the plurality of electrode portions 22 of the electrode member 20 with a body (skin) of a subject. The biological electrode 1 is used, for example, as a biological electrode for measuring electroencephalogram. In this case, the biological electrode 1 is attached to the head of the subject such that the distal end side portion of the plurality of electrode portions 22 contacts the scalp of the subject. However, it is not limited thereto. The biological electrode 1 may also be used to detect biological signals other than electroencephalogram.

In the biological electrode 1, the support member 10 is formed of an electrically insulating material (e.g., silicone rubber). In the present embodiment, the support member 10 is formed in a disk shape. The support member 10 includes a support surface 10a for supporting the electrode member 20, and a rear surface 10b opposite to the support surface 10a. In addition, in the center portion of the support member 10, a through hole 10c which penetrates the support member 10 in the thickness direction (i.e., which penetrates from the support surface 10a to the rear surface 10b) is formed (see FIG. 3).

The support member 10 may have a configuration corresponding to the support surface 10a, the rear surface 10b, and the through hole 10c, and does not necessarily have to be formed in a disk shape.

In the biological electrode 1, the electrode member 20 is formed of a conductive rubber, and has a supported portion 21 supported by the support member 10, and a plurality of electrode portions 22 protruding from the supported portion 21 on the opposite side to the support member 10, as described above. In the present embodiment, the conductive rubber is a so-called conductive silicone rubber containing silicone rubber and metal particles. The silicone rubber is, for example, a room temperature-curable liquid silicone rubber, and the metal particles are, for example, silver particles. A room temperature-curable liquid silicone rubber is a silicone rubber which is in a liquid state or a paste state before curing, and which undergoes a curing reaction at 20° C. to 100° C. to become a rubber elastic body. The silver particles may include aggregated particles (aggregates) in a state in which a plurality of silver particles (primary particles) are stuck or flaked silver particles.

The conductive rubber forming the electrode member 20 may contain other metallic particles and carbon-based material particles (such as carbon black and carbon nanotubes) having conductivity instead of silver particles, and may contain reinforcing materials, fillers, and various additives as appropriate.

The supported portion 21 of the electrode member 20 has the same shape as that of the support member 10. That is, in the present embodiment, the supported portion 21 is formed in a disk shape. The supported portion 21 has a supported surface 21a supported by the support surface 10a of the support member 10, and an electrode portion forming surface 21b on the opposite side to the supported surface 21a.

A plurality of electrode portions 22 are protrusively formed on the electrode portion forming surface 21b of the supported portion 21. The plurality of electrode portions 22 are arranged concentrically on the electrode portion forming surface 21b. Specifically, each of the plurality of electrode portions 22 is arranged so as to be positioned on the circumference of two virtual concentric circles (hereinafter, simply referred to as "concentric circles") 23 and 24 on the electrode portion forming surface 21b. Further, each of the plurality of electrode portions 22 is formed so that a cross-sectional area thereof gradually decreases from a proximal end portion (base portion) thereof toward a distal end portion thereof, in other words, as the distance from the electrode portion forming surface 21b.

Specifically, in the present embodiment, each of the plurality of electrode portions 22 has a circular cross section, and gradually decreases in diameter from the proximal end portion toward the distal end portion. The center C1 of the cross section of each of the proximal end portions of the plurality of electrode portions 22 is arranged so as to be positioned on the circumference of any of the concentric circles 23 and 24 (It does not have to be strictly positioned on the circumferences, and it may be positioned approximately on the circumference).

Each distal end portion of the plurality of electrode portions 22 is formed in a hemispherical shape. In addition, each of the plurality of electrode portions 22 is formed so that the center C2 of the distal end portion (also referred to as the center of the cross section of the distal end portion) is positioned radially outward of the center C1 of the cross section of the proximal end portion, when viewed from the arrangement center O of the plurality of electrode portions 22 (i.e., the center of the concentric circles 23 and 24). That is, in the present embodiment, each of the plurality of electrode portions 22 has an oblique conical shape with a rounded apex. Incidentally, reference numeral OL in FIG. 3 is a center line of the concentric circles 23 and 24, and shows a perpendicular line of the electrode portion forming surface 21b passing through the arrangement center O.

Furthermore, in the present embodiment, the plurality of electrode portions 22 are arranged at equal intervals in the circumferential direction (It does not have to be strictly an equal interval, and it may be approximately an equal interval). Specifically, each of the plurality of electrode portions 22 is arranged at equal intervals on the circumference of any of the concentric circles 23 and 24.

Figure 4:
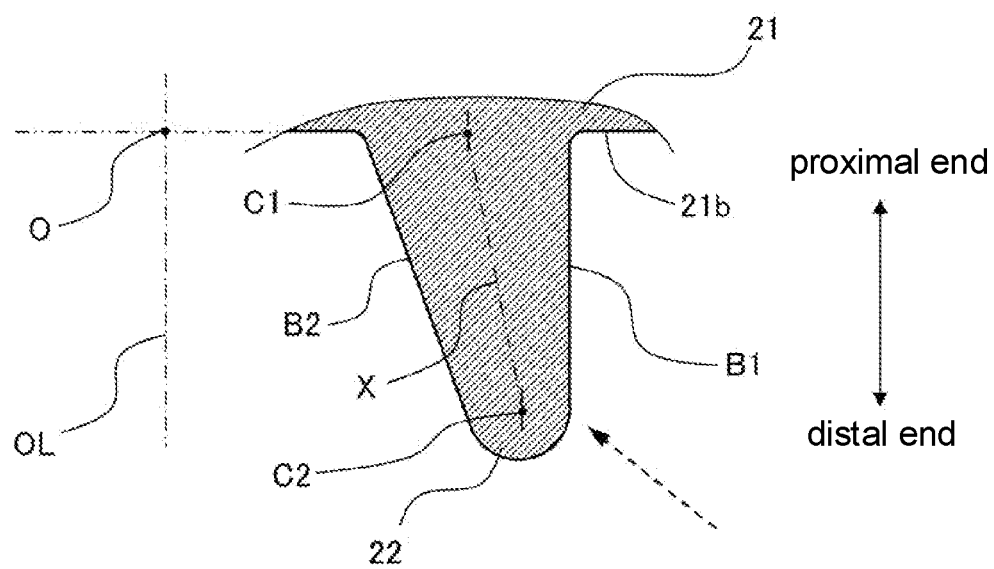
FIG. 4 is a longitudinal section view (an enlarged view) of the electrode portion of the biological electrode.

FIG. 4 is a longitudinal section view (an enlarged view) of the electrode portion 22 cut in a plane including a perpendicular line OL of the electrode portion forming surface 21b passing through the arrangement center O (i.e., the center line of the concentric circles 23 and 24). As shown in FIG. 4, in each of the plurality of electrode portions 22, the virtual straight line X connecting the center C1 of the cross section of the proximal end portion and the center C2 of the cross section of the distal end portion is inclined in such a manner that the virtual straight line X is further away from the perpendicular line OL of the electrode portion forming surface 21b passing through the arrangement center O (the center line of the concentric circles 23 and 24), toward the distal end portion from the proximal end portion.

Further, in the present embodiment, in each of the plurality of electrode portions 22, the bus line B1 at a position farthest from the arrangement center O is perpendicular to the electrode portion forming surface 21b. On the other hand, the bus line B2 at a position closest to the arrangement center O of the plurality of electrode portions 22 is inclined in such a manner that the bus line B2 is further away from the perpendicular line OL of the electrode portion forming surface 21b passing through the arrangement center O, toward the distal end portion from the proximal end portion. Here, the term "vertical" in this specification does not mean vertical in a strict sense, and an inclination of about ±3 degrees is acceptable.

In the biological electrode 1, the connector 30 is formed as a snap button type connector. More specifically, the connector 30 is formed as a male side connector in the snap button type connector. In this embodiment, the connector 30 includes a first conductive member 40 and a second conductive member 50 fitted to each other (see FIG. 3).

The first conductive member 40 and the second conductive member 50 are formed of stainless steel, for example. In the first conductive member 40, one end side is embedded in the supported portion 21 of the electrode member 20 and extends through the support member 10, and the other end side protrudes from the rear surface 10b of the support member 10. The second conductive member 50 is disposed on the rear surface 10b of the support member 10, in a state of being fitted to the other end side of the first conductive member 40. Then, the electrode member 20 of the biological electrode 1 is electrically connected to the outside by mounting (fitting) the female side connector (not shown) of the snap button type connector to the second conductive member 50. That is, the connector 30 is configured such that a part thereof is embedded in the supported portion 21 of the electrode member 20 and extends through the support member 10 to have a connecting portion to the outside which is positioned on a rear surface 10b of the support member 10.

For example, the electrode member 20 of the biological electrode 1 is electrically connected to a measuring device by mounting (fitting) a female side connector attached to the distal end of a lead wire of the measuring device to the second conductive member 50. The measuring device is a device for inputting a biological signal detected by the plurality of electrode portions 22 of the electrode member 20 of the biological electrode 1, and processing, displaying, and/or analyzing the inputted biological signal, and is not particularly limited, but may be, for example, an electroencephalogram measuring device, a wearable information device, and a health monitoring device.

The first conductive member 40 and the second conductive member 50 will be specifically described with reference to FIG. 3. In the present embodiment, the first conductive member 40 and the second conductive member 50 are formed in a flanged bottomed cylindrical shape.

The first conductive member 40 includes a first bottomed cylindrical portion 41 having an open end 41a at one end and a closed end (bottom) 41b at the other end, and a first flange portion 42 extending radially outward from the open end 41a of the first bottomed cylindrical portion 41. The outer diameter of the first bottomed cylindrical portion 41 is set to substantially the same as the diameter of the through hole 10c of the support member 10. A fitting portion 43 recessed in the radial direction is formed in a portion near the closed end 41b on the outer peripheral surface of the first bottomed cylindrical portion 41. The first flange portion 42 is slightly inclined so that the outer side in the radial direction is positioned closer to the closed end 41b of the first bottomed cylindrical portion 41 than the inner side.

In the first conductive member 40, mainly the surface 42a opposite to the first bottomed cylindrical portion 41 side of the first flange portion 42 is embedded in the supported portion 21 of the electrode member 20, the first bottomed cylindrical portion 41 is inserted into the through hole 10c of the support member 10 (i.e., extends through the support member 10), and a portion in the closed end 41b side of the first bottomed cylindrical portion 41 (including the fitting portion 43) protrudes from the rear surface 10b of the support member 10. In the following, the surface 42a opposite to the first bottomed cylindrical portion 41 side of the first flange portion 42 is referred to as "embedded surface".

The second conductive member 50 includes a second bottomed cylindrical portion 51 having an open end 51a at one end and a closed end (bottom) 51b at the other end, and a second flange portion 52 extending radially outward from the open end 51a of the second bottomed cylindrical portion 51. The second bottomed cylindrical portion 51 is formed so as to increase the inner diameter toward the closed end 51b from the open end 51a. The inner diameter of the open end 51a of the second bottomed cylindrical portion 51 is set to substantially the same as the outer diameter of the fitting portion 43 formed on the outer peripheral surface of the first bottomed cylindrical portion 41 of the first conductive member 40. Incidentally, the side surface and the bottom surface of the second bottomed cylindrical portion 51 are connected with a smooth curved surface. The second flange portion 52 has an inclined portion inclined so that the outer side in the radial direction is away from the closed end 51b of the second bottomed cylindrical portion 51 than the inner side.

In the second conductive member 50, the open end 51a of the second bottomed cylindrical portion 51 is fitted and fixed to the fitting portion 43 of the first bottomed cylindrical portion 41 of the first conductive member 40, by caulking and the like, thereby, the connector 30 of the biological electrode 1 is formed.

Here, an example of a method for manufacturing the biological electrode 1 will be briefly described. In the following description, it is assumed that the connector 30 is attached to the support member 10 in advance. Specifically, it is assumed that the first bottomed cylindrical portion 41 of the first conductive member 40 is inserted into the through hole 10c of the support member 10 from the closed end 41b side, the open end 51a of the second bottomed cylindrical portion 51 of the second conductive member 50 is fitted to the fitting portion 43 of the first bottomed cylindrical portion 41 of the first conductive member 40 protruding from the rear surface 10b of the support member 10, thereby, the assembly of the support member 10 and the connector 30 is formed in advance. That is, in the present embodiment, the connector 30 is a member provided on the support member 10 side.

In manufacturing the biological electrode 1, first, a conductive rubber which is in a liquid state of a paste state and contains silicone rubber and metal particles is stirred, and the stirred conductive rubber is injected into a molding die (cavity) having a shape of the electrode member 20. Thus, the conductive rubber is formed in the shape of the electrode member 20 in the molding die.

Next, the support member 10 to which the connector 30 is attached, that is, the assembly of the support member 10 and the connector 30 is placed on the conductive rubber in the molding die with the support surface 10a of the support member 10 facing downward. Thereby, the support surface 10a of the support member 10 is placed on a portion corresponding to the supported surface 21a of the supported portion 21 of the conductive rubber formed in the shape of the electrode member 20. Further, the embedded surface 42a of the first flange portion 42 of the first conductive member 40 is embedded in a portion corresponding to the supported portion 21 of the conductive rubber formed in the shape of the electrode member 20.

Next, the conductive rubbers molded in the form of electrode member 20 are crosslinked, with the assembly of the support member 10 and the connector 30 placed thereon. Thus, the conductive rubber formed in the shape of the electrode member 20 is cured, and the first conductive member 40 and electrode member 20 are integrated. That is, the connector 30 and (the supported portion 21 of) the electrode member 20 are molded integrally. Furthermore, the support member 10, the electrode member 20 and the connector 30 are integrated. Thereafter, the integrated support member 10, electrode member 20 and connector 30 are removed from the molding die (demolded) and post-processed as required to complete the biological electrode 1.

As described above, the biological electrode 1 according to the embodiment includes an electrode member 20 made of a conductive rubber having a plurality of electrode portions 22 in contact with a body of a subject. The plurality of electrode portions 22 are protrusively formed on an electrode portion forming surface 21b of the supported portion 21 of the electrode member 20 and arranged concentrically on the electrode portion forming surface 21b. Further, each of the plurality of electrode portions 22 is formed so that a cross-sectional area thereof gradually decreases from a proximal end portion (base portion) thereof toward a distal end portion thereof and a center C2 of a cross section of the distal end portion is positioned radially outward of a center C1 of a cross section of the proximal end portion as viewed from an arrangement center O of the plurality of electrode portions 22.

Further, in each of the plurality of electrode portions 22, the virtual straight line X connecting the center C1 of the cross section of the proximal end portion and the center C2 of the cross section of the distal end portion is inclined in such a manner that the virtual straight line X is further away from the perpendicular line OL of the electrode portion forming surface 21b passing through the arrangement center O, toward the distal end portion from the proximal end portion.

Therefore, while ensuring the flexibility and elasticity of each electrode portion 22, the shape of each electrode portion 22 can be a shape that can be difficult to bend (fall) in the direction opposite to the direction in which each electrode portion 22 extends (also referred to as inward, here refers to the direction toward the arrangement center O of the plurality of electrode portions 22). In other words, as compared with the prior art, the shape of each electrode portion 22 can be a shape that hardly affected by the load input to the distal end side from the outer diagonal direction (see broken line arrow in FIG. 4) and have increased rigidity to the load. Therefore, even when a relatively strong pressing force is repeatedly applied to the biological electrode 1, it is suppressed that the distal end side portion of each electrode portion 22 is bent in the direction opposite to the direction in which it extends, stable contact of the plurality of electrode portions 22 with respect to the body of the subject can be maintained.

Further, the plurality of electrode portions 22 are arranged at equal intervals on the circumferential direction. Therefore, when a pressing force is applied to the biological electrode 1, it is suppressed that the stress is biased to act on some of the electrode portions 22. Therefore, it can be also suppressed that some of the electrode portions 22 are deformed to a greater extent than the remaining electrode portions 22 and cannot be stably contacted with the body of the subject.

In the present embodiment, each of the plurality of electrode portions 22 has an oblique conical shape with a rounded apex. Therefore, it can be effectively suppressed that each electrode portions 22 is bent in the direction opposite to the direction in which it extends, and the distal end side portion of the plurality of electrode portions 22 can be stably contacted with the body of the subject with little discomfort to the subject.

Further, in the present embodiment, in each of the plurality of electrode portions 22, the bus line B1 at a position farthest from the arrangement center O of the plurality of electrode portions 22 is perpendicular to the electrode portion forming surface 21b (as described above, an inclination of about ±3 degrees is acceptable). Therefore, while preventing a decrease in workability at the time of demolding by suppressing the generation of the undercut portion, the shape of each electrode portion 22 can be a shape which is hardly affected by the load input to the distal end side from the outer oblique direction and increases the rigidity to the load input from the outer oblique direction.

Figure 5:
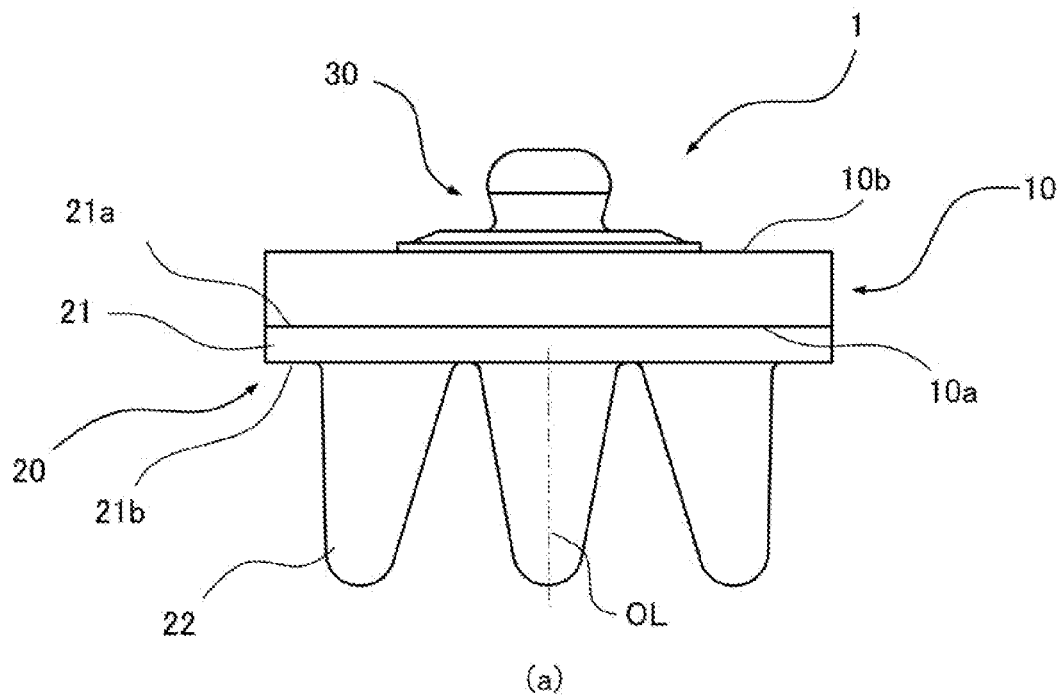
FIG. 5 is a drawing showing the biological electrode according to another embodiment of the present invention, (a) is a front view, and (b) is a bottom view.
Figure 5:
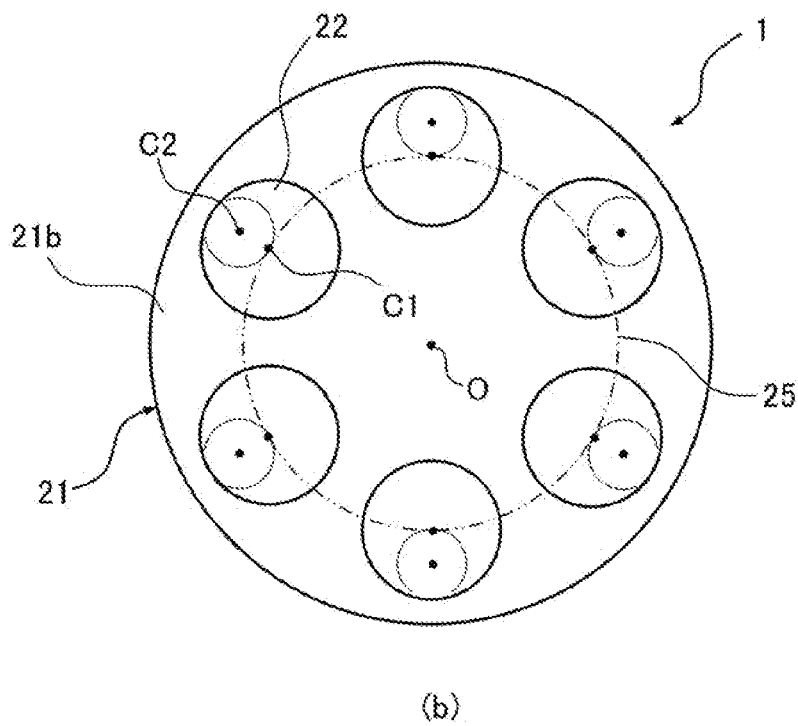

In the embodiment described above, the plurality of electrode portions 22 are arranged concentrically on the electrode portion forming surface 21b. However, the present invention is not limited thereto. As shown in FIG. 5, the plurality of electrode portions 22 may be arranged circularly. In this case, each of the plurality of electrode portions 22 is arranged so as to be positioned on the circumference of the virtual circle 25 on the electrode portion forming surface 21b. Also in FIG. 5, reference numeral O indicates the arrangement center of the plurality of electrode portions 22 (the center of the virtual circle 25), reference numeral OL indicates the perpendicular line of the electrode portion forming surface 21b passing through the arrangement center O (the center line of the virtual circle 25).

In the embodiment described above, each of the plurality of electrode portions 22 is arranged so as to be positioned on the circumference of two virtual concentric circles 23 and 24 on the electrode portion forming surface 21b of the supported portion 21 of the electrode member 20. However, the present invention is not limited thereto. Each of the plurality of electrode portions 22 may be arranged so as to be positioned on the circumference of three or more virtual concentric circles.

Although not shown, the biological electrode 1 may have an additional electrode portion of any shape which is brought into contact with the body of the subject in addition to the plurality of electrode portions 22 as needed.

In the embodiment described above, each of the plurality of electrode portions 22 has a circular cross section. However, the present invention is not limited thereto. For example, each of the plurality of electrode portions 22 may have a cross-section of a shape other than circular (e.g., a rounded corner polygon).

Figure 6:
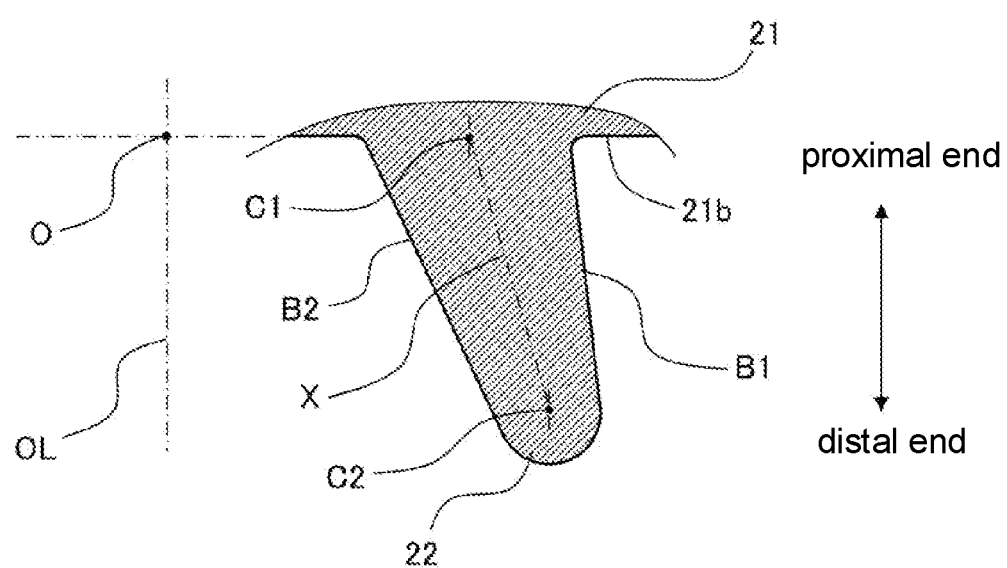
FIG. 6 is a drawing showing another shape of the electrode portion of the biological electrode (corresponding to FIG. 4).

Further, in the embodiment described above, each of the plurality of electrode portions 22 has an oblique conical shape with a rounded apex. In each of the plurality of electrode portions 22, the bus line B1 at a position farthest from the arrangement center O of the plurality of electrode portions 22 is perpendicular to the electrode portion forming surface 21b. However, the present invention is not limited thereto. It is sufficient that the center C2 of the cross section of the distal end portion is located radially outward of the center C1 of the cross section of the proximal end portion as viewed from the arrangement center O. For example, as shown in FIG. 6, the bus line B1 at a position farthest from the arrangement center O may be inclined in such a manner that the bus line B1 is further away from the perpendicular line OL of the electrode portion forming surface 21b passing through the arrangement center O, toward the distal end portion from the proximal end portion, similarly to the bus line B2 at a position closest to the arrangement center O. However, in consideration of workability at the time of demolding, it is preferable that each of the plurality of electrode portions 22 has the shape of the embodiment described above.

While embodiments of the present invention and modified examples thereof have been described above, the present invention is not limited to the above-described embodiments and modified examples thereof, and further modifications and changes can be made based on the technical idea of the present invention.

DESCRIPTION OF REFERENCE NUMERALS

1: biological electrode
10: support member
10a: support surface
10b: rear surface
10c: through hole
20: electrode member
21: supported portion
21a: supported surface
21b: electrode portion forming surface
22: electrode portion
23,24: virtual concentric circle
25: virtual circle
30: connector
40: first conductive member
50: second conductive member
C1: center of the cross section of the proximal end portion of the electrode portion
C2: center of the distal end portion of the electrode portion
O: arrangement center of the plurality of electrode portions
OL: perpendicular line of the electrode portion forming surface passing through the arrangement center

The invention claimed is:

1. A biological electrode comprising an electrode member made of a conductive rubber having a plurality of electrode portions in contact with a body of a subject, wherein
the plurality of electrode portions are protrusively formed on an electrode portion forming surface of the electrode member and arranged circularly or concentrically on the electrode portion forming surface, and
each of the plurality of electrode portions is formed so that a cross-sectional area thereof gradually decreases from a proximal end portion thereof toward a distal end portion thereof and a center of a cross section of the distal end portion is positioned radially outward of a center of a cross section of the proximal end portion as viewed from an arrangement center of the plurality of electrode portions, wherein
the distal end portion has a hemispherical shape, wherein a diameter of the hemispherical shape defines an outer periphery of the distal end portion, wherein the distal end portion is positioned within an outer periphery of the proximal end portion with respect to a bottom plan view of the electrode portion forming surface, and wherein the diameter of the hemispherical shape is approximately one half a diameter of the outer periphery of the proximal end portion.

2. The biological electrode according to claim 1, wherein in each of the plurality of electrode portions, a virtual straight line connecting the center of the cross section of the proximal end portion and the center of the cross section of the distal end portion is inclined in such a manner that the virtual straight line is further away from a perpendicular line of the electrode portion forming surface passing through the arrangement center, toward the distal end portion from the proximal end portion.

3. The biological electrode according to claim 2, wherein each of the plurality of electrode portions is arranged so as to be positioned on a circumference of one virtual circle or a plurality of virtual concentric circles on the electrode portion forming surface.

4. The biological electrode according to claim 3, wherein each of the plurality of electrode portions has an oblique conical shape with a rounded apex.

5. The biological electrode according to claim 4, wherein, in each of the plurality of electrode portions, a line coinciding with an outer side of each of the plurality of electrode portions and at a position farthest from the arrangement center with respect to the bottom plan view, is perpendicular to the electrode portion forming surface.

6. The biological electrode according to claim 2, wherein each of the plurality of electrode portions has an oblique conical shape with a rounded apex.

7. The biological electrode according to claim 6, wherein, in each of the plurality of electrode portions, a line coinciding with an outer side of each of the plurality of electrode portions and at a position farthest from the arrangement center with respect to the bottom plan view, is perpendicular to the electrode portion forming surface.

8. The biological electrode according to claim 1, wherein each of the plurality of electrode portions is arranged so as to be positioned on a circumference of one virtual circle or a plurality of virtual concentric circles on the electrode portion forming surface.

9. The biological electrode according to claim 8, wherein each of the plurality of electrode portions has an oblique conical shape with a rounded apex.

10. The biological electrode according to claim 9, wherein, in each of the plurality of electrode portions, a line coinciding with an outer side of each of the plurality of electrode portions and at a position farthest from the arrangement center with respect to the bottom plan view, is perpendicular to the electrode portion forming surface.

11. The biological electrode according to claim 1, wherein each of the plurality of electrode portions has an oblique conical shape with a rounded apex.

12. The biological electrode according to claim 11, wherein, in each of the plurality of electrode portions, a line coinciding with an outer side of each of the plurality of electrode portions and at a position farthest from the arrangement center with respect to the bottom plan view, is perpendicular to the electrode portion forming surface.

13. A biological electrode comprising,
a support member,
an electrode member made of a conductive rubber having
a supported portion supported by the support member and a plurality of electrode portions provided so as to protrude from the supported portion on the opposite side to the support member and bring into contact with a body of a subject,
a connector that electrically connects the electrode member to the outside and is configured such that a part thereof is embedded in the supported portion of the electrode member and extends through the support member to have a connecting portion to the outside which is positioned on a surface of the support member on the opposite side to the electrode member, wherein the plurality of electrode portions are arranged circularly or concentrically on an electrode portion forming surface of the supported portion, and each of the plurality of electrode portions is formed so that a cross-sectional area thereof gradually decreases from a proximal end portion thereof toward a distal end portion thereof and a center of a cross section of the distal end portion is positioned radially outward of a center of a cross section of the proximal end portion as viewed from an arrangement center of the plurality of electrode portions, wherein the distal end portion has a hemispherical shape, wherein a diameter of the hemispherical shape defines an outer periphery of the distal end portion, wherein the distal end portion is positioned within an outer periphery of the proximal end portion with respect to a bottom plan view of the electrode portion forming surface, and wherein the diameter of the hemispherical shape is approximately one half a diameter of the outer periphery of the proximal end portion.

\* \* \* \* \*